(12) United States Patent
Fukuda et al.

(10) Patent No.: US 10,878,644 B2
(45) Date of Patent: Dec. 29, 2020

(54) VEHICLE PORT DEVICE

(71) Applicant: HONDA MOTOR CO., LTD., Tokyo (JP)

(72) Inventors: Shuta Fukuda, Wako (JP); Hideaki Ito, Wako (JP); Yukinobu Nakanishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/572,958

(22) Filed: Sep. 17, 2019

(65) Prior Publication Data
US 2020/0105074 A1 Apr. 2, 2020

(30) Foreign Application Priority Data
Sep. 27, 2018 (JP) ................. 2018-181343

(51) Int. Cl.
| *G07C 5/08* | (2006.01) |
| *B60L 53/16* | (2019.01) |
| *B60K 15/05* | (2006.01) |
| *B60S 5/02* | (2006.01) |
| *B60Q 1/50* | (2006.01) |
| *E05D 3/02* | (2006.01) |

(52) U.S. Cl.
CPC ............ *G07C 5/0825* (2013.01); *B60K 15/05* (2013.01); *B60L 53/16* (2019.02); *B60Q 1/50* (2013.01); *B60S 5/02* (2013.01); *B60Y 2200/91* (2013.01); *B60Y 2300/91* (2013.01); *E05D 3/02* (2013.01); *E05Y 2900/534* (2013.01); *E05Y 2900/536* (2013.01)

(58) Field of Classification Search
CPC ......... G07C 5/0825; B60L 53/16; B60Q 1/50; B60K 15/05; B60S 5/02; B60Y 2200/91; B60Y 2300/91; E05D 3/02; E05Y 2900/534; E05Y 2900/536
USPC ........................................................ 340/468
See application file for complete search history.

(56) References Cited

U.S. PATENT DOCUMENTS

| 2010/0026238 A1* | 2/2010 | Suzuki ................. B60Q 1/2661 320/109 |
| 2010/0045450 A1* | 2/2010 | Suzuki ................. B60L 15/007 340/438 |

(Continued)

FOREIGN PATENT DOCUMENTS

| JP | 2008254700 A | 10/2008 |
| JP | 2012064504 A | 3/2012 |

(Continued)

OTHER PUBLICATIONS

English Translation of Notice of Reasons for Refusal for JP Patent Application No. 2018-181343 drafted Jul. 21, 2020; 6 pp.

*Primary Examiner* — Omar Casillashernandez
(74) *Attorney, Agent, or Firm* — Armstrong Teasdale LLP

(57) ABSTRACT

Provided is a vehicle port device that includes a lid (38) that selectively closes an opening (44) of a port accommodating space facing outwardly on a vehicle body, a first display unit (52) positioned in the port accommodating space, and a second display unit (54) configured to indicate a failure in the port module and positioned in the port accommodating space. The lid includes a translucent part (46A) opposing the first display unit and an opaque part (46B) opposing the second display unit in a closed state of the lid.

9 Claims, 7 Drawing Sheets

(56) References Cited

U.S. PATENT DOCUMENTS

| | | | |
|---|---|---|---|
| 2011/0043355 A1* | 2/2011 | Chander | B60L 53/16 340/455 |
| 2013/0074985 A1* | 3/2013 | Ferguson | F01M 11/0458 141/98 |
| 2015/0048644 A1* | 2/2015 | Georgi | B60K 15/05 296/97.22 |
| 2015/0197157 A1* | 7/2015 | Nakajima | B60L 50/66 439/352 |
| 2017/0240060 A1* | 8/2017 | Roberts | B60L 53/16 |
| 2018/0287287 A1* | 10/2018 | Buttolo | B60R 16/03 |

FOREIGN PATENT DOCUMENTS

| | | |
|---|---|---|
| JP | 2012080646 A | 4/2012 |
| JP | 2012226873 A | 11/2012 |
| JP | 2017062873 A | 3/2017 |
| JP | 2018043744 A | 3/2018 |

\* cited by examiner

VEHICLE PORT DEVICE

TECHNICAL FIELD

The present invention relates to a vehicle port device, and more particularly to a vehicle port device provided with an optical display.

BACKGROUND ART

In order to facilitate plugging and unplugging of a charging cable in a dark place, it is known to provide an illuminating arrangement for illuminating an area of the vehicle body of an electric vehicle where a charging port is located. See JP 2008-254700A, for instance.

It is also conceivable to provide a warning lamp or a LCD panel adjacent to the charging port to indicate the charging status or any charging failure.

The port device is typically provided with a lid to selectively expose the charging port therein. In such a case, it is not desirable if the warning lamp or the LCD panel is visible even when the lid is closed because the warning lamp or the LCD panel may cause an undesired distraction to a bystander.

SUMMARY OF THE INVENTION

In view of such a problem of the prior art, a primary object of the present invention is to provide a vehicle port device provided with an optical display or an optical indicator which does not distract a bystander.

The present invention accomplishes such an object by providing a vehicle port device (30), comprising: a housing (36) that at least partly defines a port accommodating space (42) accommodating therein a port module (34) including at least one of a charging port (40), a power feeding port, and a fueling port; a lid (38) that selectively closes an opening (44) of the port accommodating space facing outwardly on a vehicle body; a first display unit (52) positioned in the port accommodating space; and a second display unit (54) positioned in the port accommodating space and configured to indicate a failure in the port module, wherein the lid includes a translucent part (46A) opposing the first display unit and an opaque part (46B) opposing the second display unit in a closed state of the lid.

Thereby, the first display unit may be configured to emit light that passes through or illuminates the translucent part, and to serve as a welcome light or the like when the lid is closed. On the other hand, when the lid is closed, the light emitted from the second display unit is shielded by the opaque part of the lid from the view of a bystander so that the bystander is prevented from being annoyed or distracted by the light from the second display unit.

Preferably, the first display unit includes a lamp emitting light toward the translucent part.

Thereby, the first display unit may conveniently function as a welcome light or any other illuminating device.

Preferably, the lid is provided in a front part of a front hood panel, and the second display unit is positioned ahead of the translucent part.

Thereby, the light emitted from the first display unit is prevented from being emitted toward a front part of the vehicle where a bystander may be present.

Preferably, the housing (36) includes a bottom wall (36D) at least partly defining a bottom part of the port accommodating space, and a front wall (36A) at least partly defining a front part of the port accommodating space, the second display unit being positioned on the bottom wall or the front wall of the housing.

Thereby, the light emitted from the second display unit is blocked by the front wall so that the bystander who may be standing in front of the vehicle is prevented from being distracted by the light emitted from the second display unit.

Preferably, the second display unit is positioned below a horizontal plane passing through a front edge of the opening.

Thereby, the light emitted from the second display unit is effectively blocked by the front wall, and is prevented from reaching an area located in front of the vehicle.

Preferably, the bottom wall is provided with a first surface to which the first display unit is mounted and a second surface to which the second display unit is mounted, the second surface extending from a front edge of the first surface with a downward slope.

Thereby, the second display unit can be positioned in a relatively low part of the port accommodating space so that the light emitted from the second display unit is effectively prevented from reaching an area located in front of the vehicle.

Preferably, the lid is provided with a hinge axis extending laterally in a bottom part of the port accommodating space, and a lid receiving recess is defined in a rear end part of the bottom wall to receive the lid in an open state therein, the translucent part being positioned in the lid receiving recess when the lid is in the open state.

Preferably, the first display unit extends annularly around the port module.

Thereby, an attractive appearance can be created. It is also possible to combine the first display unit and the second display unit into a single continuous annular display so that the front part thereof serves as the second display unit while the rear part thereof serves as the first display unit.

Preferably, a part of the first display unit opposes the translucent part, and the part of the first display unit opposing the translucent part is broader and/or brighter than a remaining part thereof.

Thereby, the first display unit can function as a welcome light and an illumination for the port module of the vehicle port device in a favorable manner.

Thus, the present invention provides a vehicle port device provided with an optical display or an optical indicator which does not distract a bystander.

BRIEF DESCRIPTION OF THE DRAWING(S)

DESCRIPTION OF THE PREFERRED EMBODIMENT(S)

A preferred embodiment of a vehicle port device according to the present invention is described in the following with reference to FIGS. 1 to 4.

Figure 1:
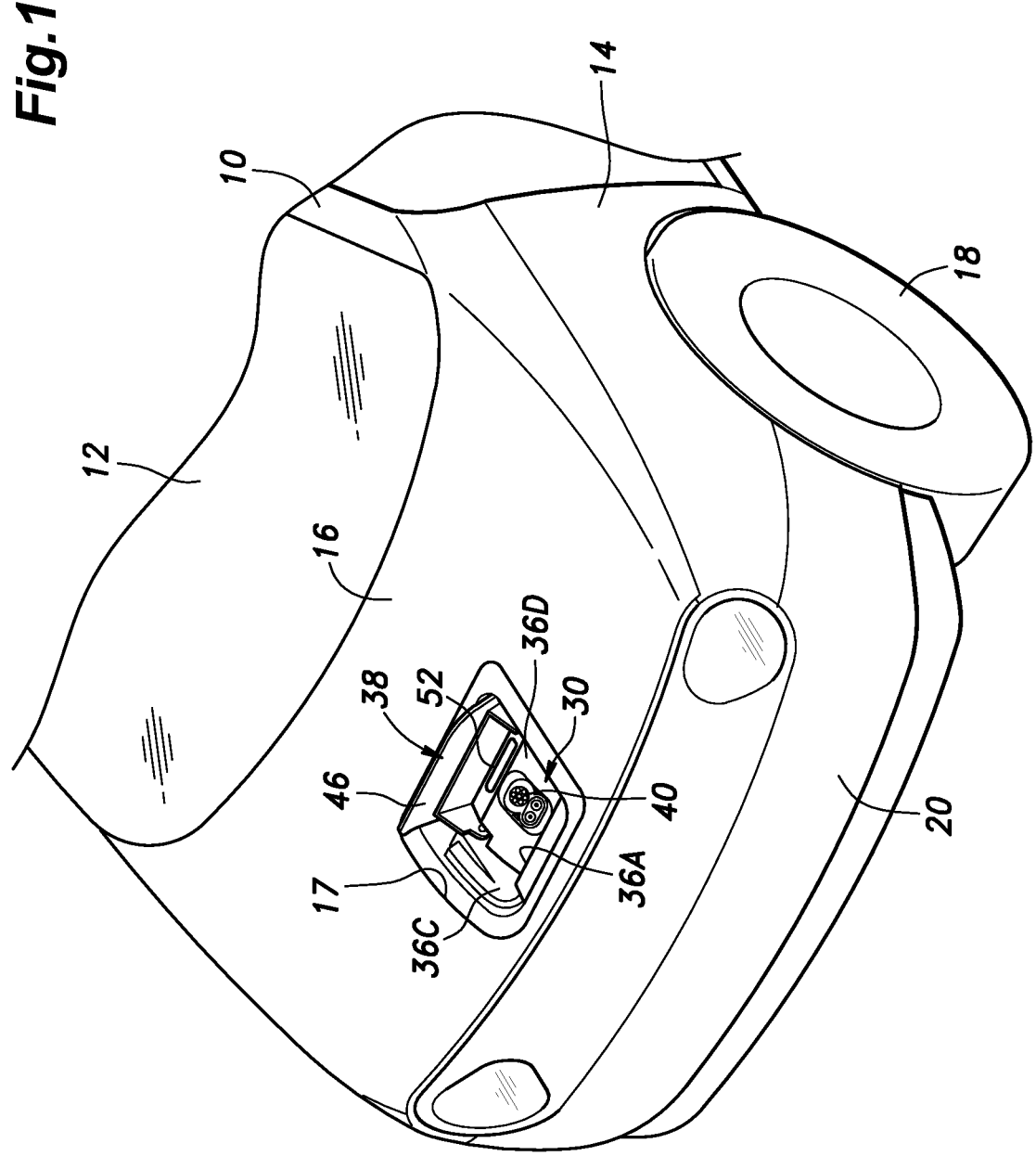
FIG. 1 is a perspective view of a front part of an electric vehicle equipped with a vehicle port device according to an embodiment of the present invention.

As shown in FIG. 1, an electric vehicle fitted with a vehicle port device 30 according to the present embodiment is provided with a front body structure including a pair of front pillars 10, a front windshield 12, a pair of front fender panels 14, a front hood panel 16, a pair of front wheels 18, and a front bumper 20. The front hood panel 16 is provided with a hood opening 17 in a front part thereof.

Figure 2:
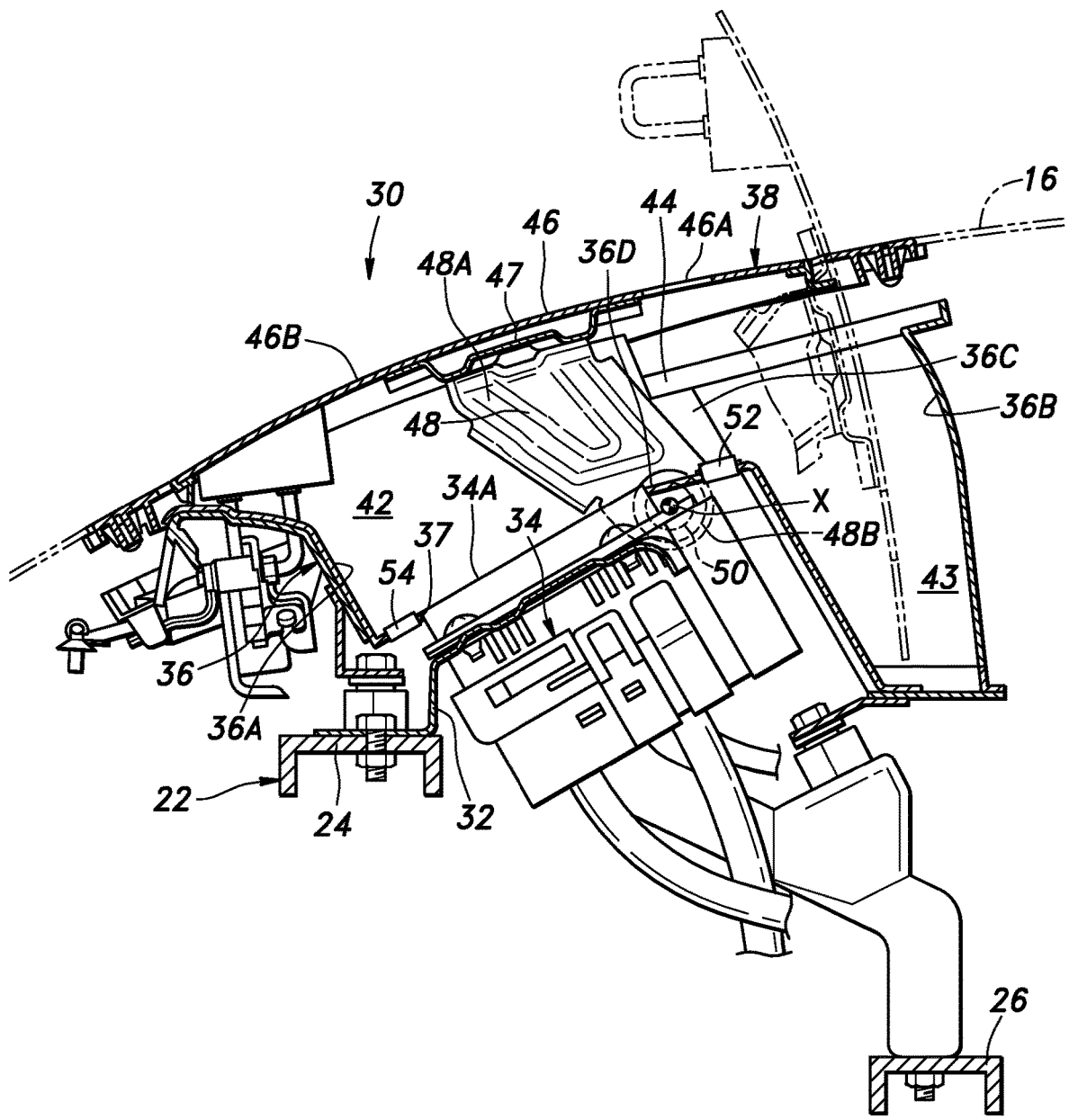
FIG. 2 is a vertical sectional view of the vehicle port device.
Figure 3:
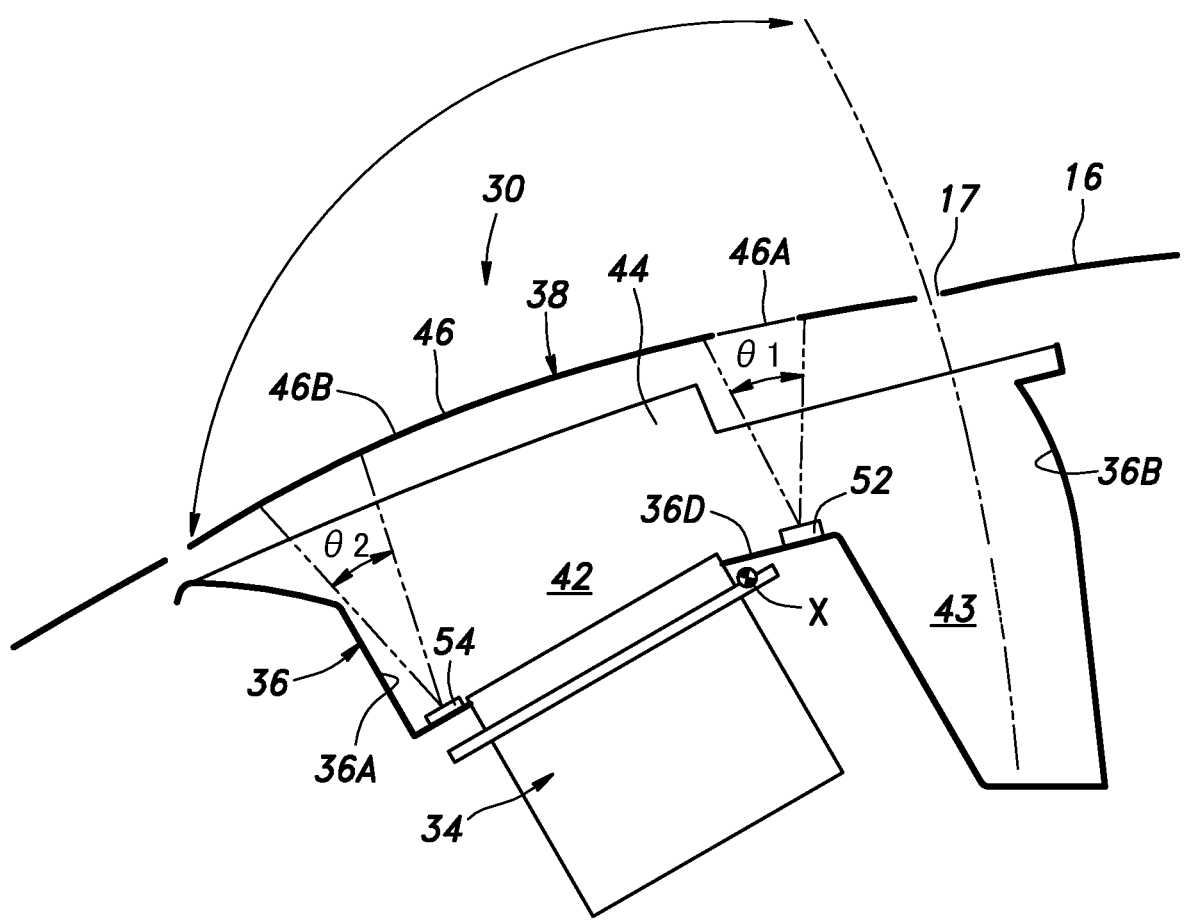
FIG. 3 is a diagram showing the overall arrangement of the vehicle port device when a lid is closed.
Figure 4:
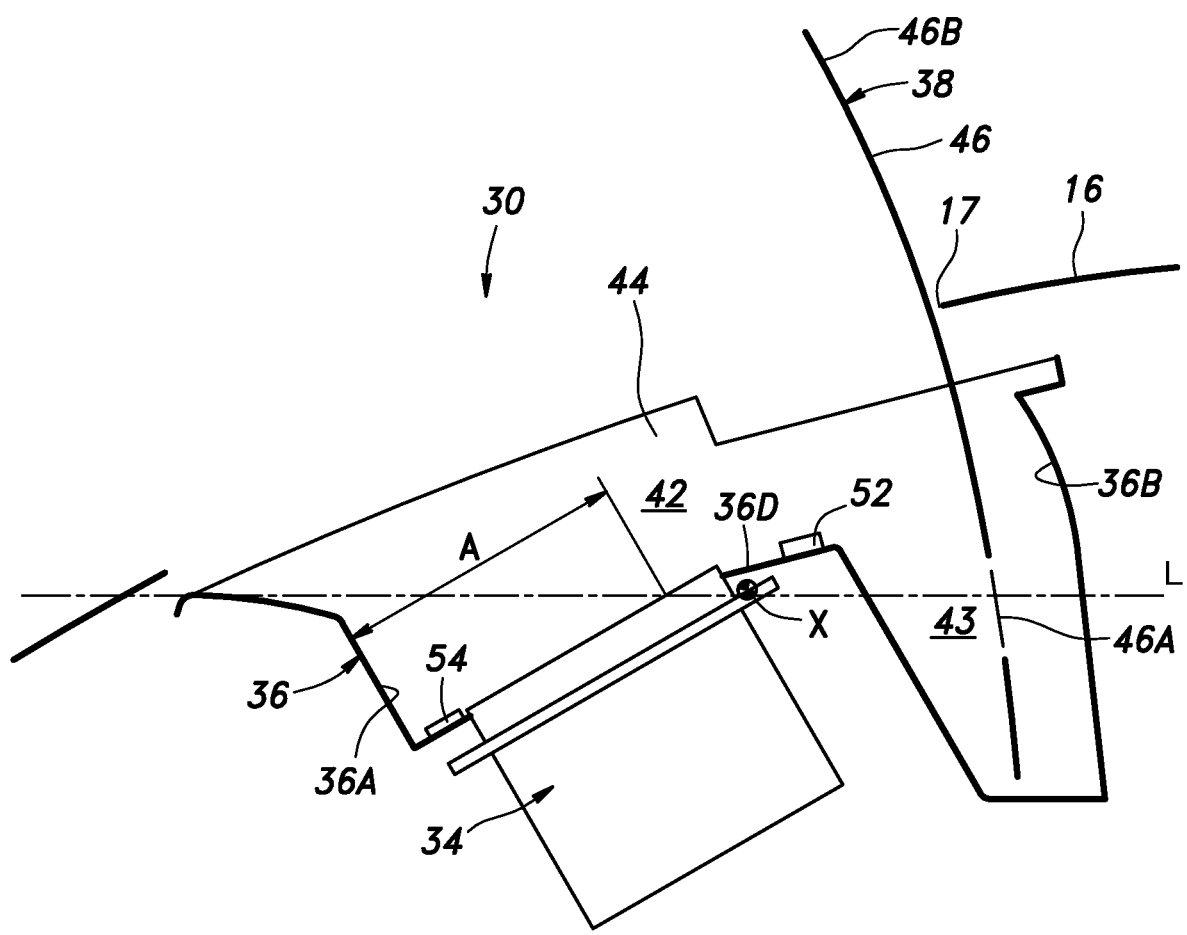
FIG. 4 is a diagram showing the overall arrangement of the vehicle port device when the lid is opened.

As shown in FIGS. 2 to 4, the vehicle port device 30 includes a support member 32 fixedly secured to the vehicle body, a port module 34, a housing 36, and a lid 38.

A front part of the support member 32 is fixed to an upper member 24 of a front bulkhead 22, and a rear part of the support member 32 is fixed to a cross member 26 positioned some distance behind the front bulkhead 22. The front bulkhead 22 is fixed to front end parts of a pair of front side members extending in the fore and aft direction, and the cross member 26 is secured to the front side members at the lateral end parts thereof.

The port module 34 is fixed to the support member 32, and a charging port 40 (FIG. 1) is positioned on a front surface of the port module 34. The charging port 40 may also sever as a power feeding port via which electric power from an onboard battery may be supplied to an external user by suitably switching internal circuitry.

The housing 36 includes a front wall 36A, a rear wall 36B, a left and a right side wall 36C, and a bottom wall 36D. The housing 36 has a box shape so as to internally define a port accommodating space 42 having an upper opening 44 substantially flush with the outer surface of the vehicle body (the front hood panel 16). The upper opening 44 is defined by the upper edges of the front wall 36A, the rear wall 36B, and the side walls 36C.

As shown in FIG. 2, the front hood panel 16 is slightly curved, and slants downward toward the front in side view. At least a front part of the bottom wall 36D (except for the rear end part thereof) is generally planar, and slants downward toward the front in plan view. The front part of the bottom wall 36D may be substantially in parallel with the front hood panel 16, but may also be steeper or less steep than the front hood panel 16.

The housing 36 has a front part fixed to the upper member 24 via the support member 32 and a rear part fixed to the cross member 26. The housing 36 is disposed below the front hood panel 16, and the upper opening 44 is aligned with the hood opening 17 in such a manner that the upper opening 44 at least in large part overlaps with the hood opening 17 when viewed from above. An opening 37 is formed in the bottom wall 36D, and the upper surface 34A of the port module 34 is exposed in the opening 37.

The lid 38 includes a plate-shaped lid main body 46 configured to fit into the hood opening 17, a leg mounting member 47 attached to the back side of the lid main body 46, and a pair of leg pieces 48 having base ends 48A fixed to the either side of the leg mounting member 47. The free end 48B of each leg piece 48 is pivotally connected to the housing 36 via a hinge shaft 50. The hinge shafts 50 of the two leg pieces 48 extend laterally so that the lid 38 can be pivoted around the hinge shafts 50 between a closed position indicated by solid lines in FIG. 2, and an open position indicated by imaginary lines in FIG. 2. As shown in FIG. 2, the common hinge axial line X of the hinge shafts 50 is located in a bottom part of the housing 36. In the illustrated embodiment, the hinge axial line X is located slightly under the bottom wall 36D, but may also be on or slightly above the bottom wall 36D.

The lid 38 turns about 90 degrees between the closed position and the open position. Since the hinge axial line X is located significantly below the upper opening 44, in the closed position of the lid 38, a rear part of the lid 38 is received in a lid receiving recess 43 defined in a rear end part of the port accommodating space 42. In the illustrated embodiment, the lid receiving recess 43 is formed by recessing a rear end part of the bottom wall 36D downward.

When the lid 38 is in the closed position, the upper surface of the lid 38 conforms with the outer contour of the front hood panel 16. When the lid 38 is in the open position, a front part of the lid 38 projects vertically upward from the outer contour of the front hood panel 16, and a rear part of the lid 38 is received in the lid receiving recess 43.

In the port accommodating space 42, a first display unit 52 and a second display unit 54 each consisting of an optical display are provided as will be described hereinafter.

The first display unit 52 is attached to a rear part of the bottom wall 36D of the housing 36, immediately in front of the front edge of the lid receiving recess 43. The first display unit 52 extends linearly and laterally, and may consist of a row of LEDs that emit light generally in an upward direction. The first display unit 52 serves as a welcome light that lights up in conjunction with a smart entry system. The first display unit 52 lights up when a user's portable device approaches the vehicle, and has a radiating angular range of θ1 (see FIG. 3) in side view. The first display unit 52 may light up also when the lid 38 is opened to illuminate the upper surface 34A of the port module 34.

The part of the bottom wall 36D on which the first display unit 52 is located is slanted downward toward the front, but is less steep than the main part of the bottom wall 36D where the port module 34 is positioned.

The second display unit 54 is attached to a front end part of the bottom wall 36D of the housing 36. The second display unit 54 also extends linearly and laterally, and may consist of a row of LEDs that emit light generally in an upward direction. The second display unit 54 serves as a warning light that lights up or blinks in case of an abnormal condition or a failure in the vehicle port device 30, and has a radiating angular range of θ2 (see FIG. 3) in side view. A failure in the vehicle port device 30 is detected, for instance, when the onboard battery fails to be charged although a charging connector is connected to the charging port 40, and when the charging of the onboard battery is not performed in a stable manner.

The second display unit 54 is positioned immediately under the front wall 36A in the illustrated embodiment. The second display unit 54 may be positioned in other ways, but preferably in a front region A defined as a region located under a horizontal plane L passing through the front edge of the upper opening 44.

The lid main body 46 may be formed by a sheet of glass or the like, and includes a translucent part 46A opposing the first display unit 52 in the closed state of the lid 38, and an opaque part 46B that accounts for the entire remaining part of the lid main body 46. The term "translucent part" as used in this disclosure means a transparent part or a frosted or otherwise light transmitting part. The "opaque part" as used in this disclosure means that the relevant part does not transmit light so that the light emitted behind the opaque part does not reach the eyes of the viewer on the outside. In the illustrated embodiment, the lid main body 46 consists of a sheet of glass, and the opaque part 46B is coated with black ceramic coating while the translucent part 46A consists of a part of the sheet glass where the black ceramic coating is absent. Preferably, the translucent part 46A may be provided with a light dispersing property so that the translucent part 46A disperses the light emitted from the first display unit 52 to the outside for an improved visibility to the user standing near. For this purpose, the translucent part 46A may be coated with a suitable light dispersing coating or may internally contain light dispersing material.

The translucent part 46A is positioned and dimensioned such that a user standing near the vehicle is able to see the light emitted from the first display unit 52 through the translucent part 46A in the closed state of the lid 38.

The opaque part 46B is positioned and dimensioned such that the light emitted from the first display unit 52 is shielded to the user standing near the vehicle, and the user is unable to see the light emitted from the first display unit 52 in the closed state of the lid 38.

When the lid 38 is open, the translucent part 46A is received in the lid receiving recess 43, and is located below the first display unit 52 and the second display unit 54 as shown in FIG. 4.

Thus, when the lid 38 is closed, and a user operates a smart key, the first display unit 52 lights up as a welcome light, and the user is able to see the welcome light.

On the other hand, when the lid 38 is closed, even when the second display unit 54 should light up, the light therefrom is not visible to a user or any other bystander by being shielded by the opaque part 46B.

Thus, when the lid 38 is closed, even when the second display unit 54 should light up, the bystander is prevented from being distracted by the light from the second display unit 54.

Since the second display unit 54 is positioned some distance in front of the translucent part 46A, even if the light emitted from the second display unit 54 reaches the translucent part 46A in the closed state of the lid 38, the light emitted from the second display unit 54 is generally directed rearward so that this light is not visible from the front of the vehicle. Thereby, the second display unit 54 is prevented from issuing unnecessary or undesirable warning to a user or a bystander standing in front of the vehicle.

When the lid 38 is opened, the light emitted from the second display unit 54 as well as the light emitted from the first display unit 52 freely passes through the upper opening 44 so that the light emitted from either the first display unit 52 or the second display unit 54 is visible to a user standing in front of the vehicle, particularly when the user is looking down on the front hood panel 16.

Even when the lid 38 is open, the second display unit 54 is positioned so near the front wall 36A that the second display unit 54 is shielded by the front wall 36A for viewer relatively remote from the vehicle. However, the light from the second display unit 54 is visible to a person who is standing near the vehicle (in particular, a person looking down on the front hood panel 16 or the vehicle port device 30), and is typically the user or a person interested in the state of the vehicle.

The second display unit 54 is not visible from the front of the vehicle body by being positioned in the front region A which is located below the horizontal plane L passing through the front edge of the upper opening 44. This also prevents the warning light emitted from the second display unit 54 from distracting a bystander who has no interest in the state of the vehicle.

When the lid 38 is open, the translucent part 46A is located in the lid receiving recess 43, and is located below the first display unit 52. Therefore, the light emitted from the first display unit 52 is prevented from being reflected or dispersed by the translucent part 46A, and is therefore prevented from being projected toward the front of the vehicle. Further, the light emitted from the second display unit 54 is blocked by the bottom wall 36D, and is therefore prevented from reaching the translucent part 46A. Therefore, unnecessary light is prevented from being projected toward the front of the vehicle body due to the presence of the translucent part 46A.

Thus, even when the lid 38 is open, the second display unit 54 is not likely to be visible to a bystander, but is highly visible to a user or any other person standing immediately near the vehicle, and interested in the state of the vehicle.

Figure 5:
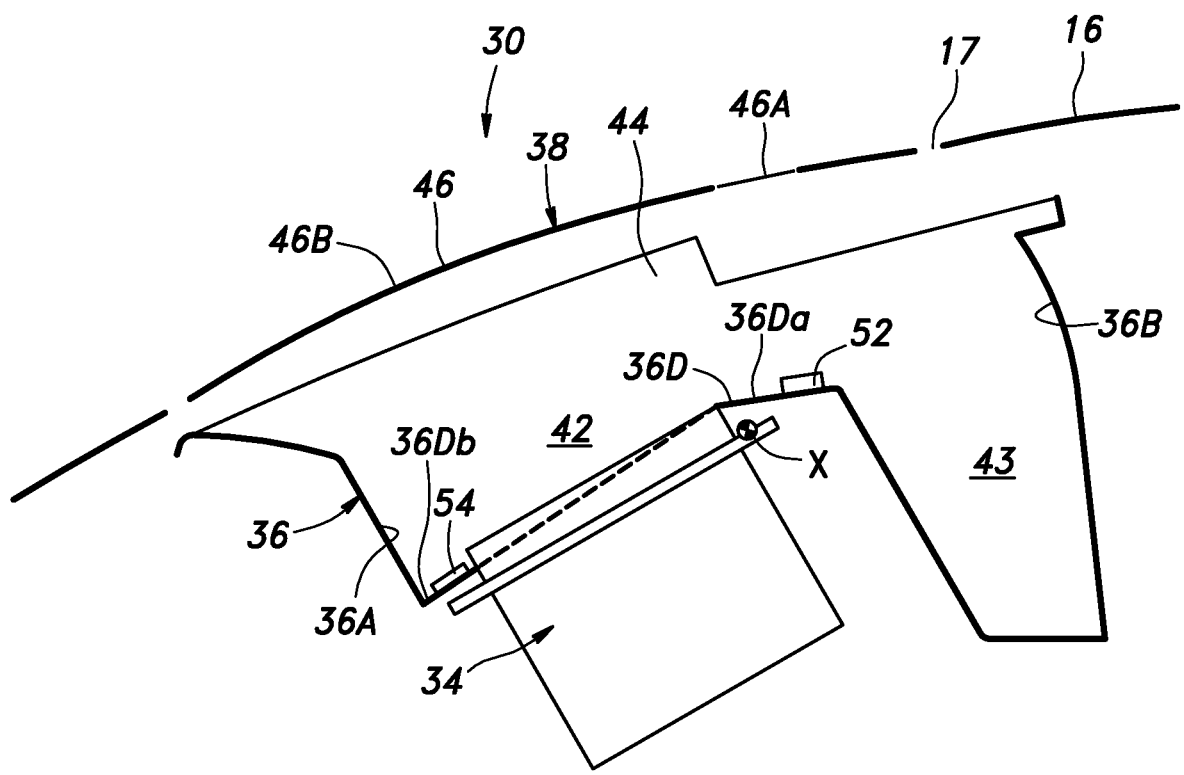
FIG. 5 is a view similar to FIG. 3 showing another embodiment of the present invention.

Another embodiment of the vehicle port device 30 according to the present invention is shown in FIG. 5. In FIG. 5, the parts corresponding to those of the previous embodiment are denoted with like numerals. Such parts may be omitted in the following disclosure to avoid redundancy.

In this embodiment, a rear part 36Da of the bottom wall 36D of the housing 36 where the first display unit 52 is positioned is slanted downward toward the front in a less steep manner as in the previous embodiment. In particular, in the illustrated embodiment, the rear part 36Da of the bottom wall 36D is slanted less steeply than the corresponding part of the lid 38 or the surrounding part of the front hood panel 16.

However, a front part 36Db of the bottom wall 36D including the part where the port module 34 is located is steeply slanted downward toward the front. In particular, the front part 36Db of the bottom wall 36D is more steeply slanted downward toward the front than the lid 38 and the surrounding part of the front hood panel 16. The second display unit 54 is positioned in the front part 36Db of the bottom wall 36D.

As a result, the second display unit 54 is positioned significantly lower than the first display unit 52 when viewed from the upper opening 44. Also, the light emitting directions of the first display unit 52 and the second display unit 54 are angularly offset from each other to a more significant degree.

Owing to the difference in elevation between the first display unit 52 and the second display unit 54, the second display unit 54 is more significantly shielded by the front wall 36A from a viewer standing in front of the vehicle. Thereby, the second display unit 54 is more effectively prevented from distracting a bystander standing in front of the vehicle.

Figure 6:
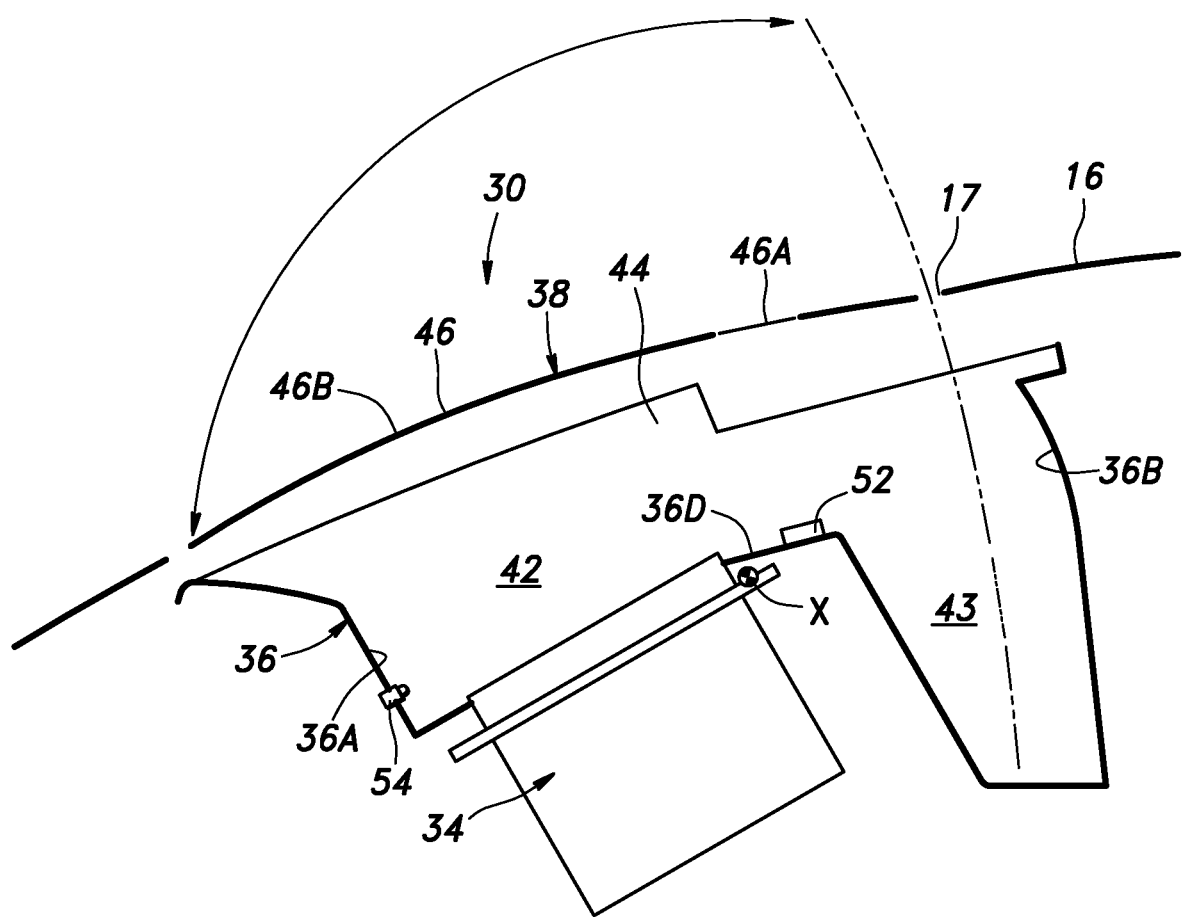
FIG. 6 is a view similar to FIG. 3 showing yet another embodiment of the present invention.

Yet another embodiment of the vehicle port device 30 according to the present invention is shown in FIG. 6. In FIG. 6, the parts corresponding to those of the previous embodiments are denoted with like numerals. Such parts may be omitted in the following disclosure to avoid redundancy.

In this embodiment, the second display unit 54 is positioned on a lower part of the front wall 36A of the housing 36, adjacent to the bottom wall 36D.

In this embodiment also, when the lid 38 is open, the second display unit 54 is not likely to be visible from the front of the vehicle body so that the second display unit 54 is prevented from distracting a bystander who happens to be in front of the vehicle.

Figure 7:
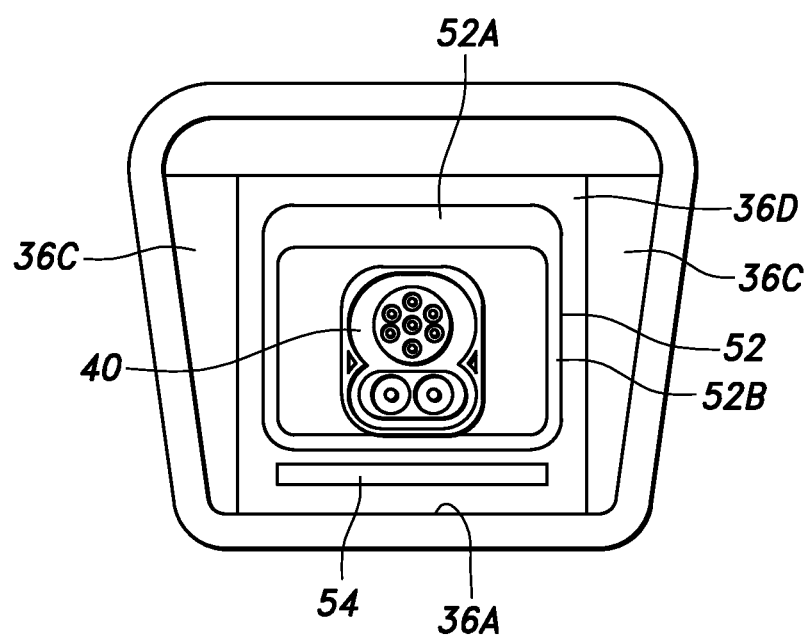
FIG. 7 is a plan view showing yet another embodiment of the present invention.

Yet another embodiment of the vehicle port device 30 according to the present invention is shown in FIG. 7. In FIG. 7, the parts corresponding to those of the previous embodiments are denoted with like numerals. Such parts may be omitted in the following disclosure to avoid redundancy.

In this embodiment, the first display unit 52 is arranged in an annular shape surrounding the periphery of the charging port 40 or the port module 34, and a rear part 52A of the first display unit 52 facing the translucent part 46A (see FIG. 2)

is wider than the remaining part 52B of the first display unit 52. Alternatively or additionally, the rear part 52A of the first display unit 52 may be brighter than the remaining part 52B of the first display unit 52. The second display unit 54 extends linearly and laterally in front of the first display unit 52.

The first display unit 52 functions as a lamp that illuminates the charging port 40 when the lid 38 is opened. When the lid 38 is closed, the rear part 52A of the first display unit 52 opposing the translucent part 46A functions as a welcome light.

If desired, the second display unit 54 may be omitted, and the front part of the first display unit 52 may function as the second display unit 54.

The present invention has been described in terms of specific embodiments thereof, but is not limited by such embodiments, and can be modified in various ways without departing from the spirit of the present invention.

For example, the housing 36 to which the first display unit 52 and the second display unit 54 are mounted may be fixed to the lower surface of the front hood panel 16. In this case, the lid 38 is rotatably attached to the front hood panel 16. The front wall 36A of the housing 36 may be located ahead of or behind the front edge of the hood opening 17. The housing 36 may be formed by a plurality of components.

The first display unit 52 and the second display unit 54 may be each formed by a LCD panel with a backlight or the like, and may optically display characters and graphics. The first display unit 52 may also be provided on the rear wall 36B or the side wall 36C of the housing 36 instead of the bottom wall 36D of the housing 36. It is also possible that the first display unit 52 extends from the bottom wall 36D to the side walls 36C and/or the rear wall 36B.

The position of the vehicle port device according to the present invention is not limited to the front part of the vehicle body, but may also be in a side part of the vehicle body or a rear part of the vehicle body. The vehicle port device according to the present invention may include a power supply port for supplying the electric power of the onboard battery to an external user, and/or a fuel supply port for supplying fuel to the onboard fuel tank in addition to or instead of the charging port. Depending on the situation, a failure in the vehicle port device may include the case where no electric power is supplied to the external user even though a power feeding cable is connected to the vehicle port device, and the case where fuel is not supplied to the onboard fuel tank even though the fuel gun is inserted into the vehicle port device.

The invention claimed is:

1. A vehicle port device, comprising:
    a housing that at least partly defines a port accommodating space accommodating therein a port module including at least one of a charging port, a power feeding port, and a fueling port;
    a lid that selectively closes an opening of the port accommodating space facing outwardly on a vehicle body;
    a first display unit positioned in the port accommodating space; and
    a second display unit positioned in the port accommodating space and configured to indicate a failure in the port module,
    wherein the lid includes a translucent part opposing the first display unit and an opaque part opposing the second display unit in a closed state of the lid, and
    the housing includes a bottom wall at least partly defining a bottom part of the port accommodating space, and a front wall at least partly defining a front part of the port accommodating space, the second display unit being positioned on the bottom wall or the front wall of the housing.

2. The vehicle port device according to claim 1, wherein the first display unit includes a lamp emitting light toward the translucent part.

3. The vehicle port device according to claim 1, wherein the lid is provided in a front part of a front hood panel, and the second display unit is positioned ahead of the translucent part.

4. The vehicle port device according to claim 1, wherein the second display unit is positioned below a horizontal plane passing through a front edge of the opening.

5. The vehicle port device according to claim 1, wherein the bottom wall is provided with a first surface to which the first display unit is mounted and a second surface to which the second display unit is mounted, the second surface extending from a front edge of the first surface with a downward slope.

6. The vehicle port device according to claim 1, wherein the lid is provided with a hinge axis extending laterally in a bottom part of the port accommodating space, and a lid receiving recess is defined in a rear end part of the bottom wall to receive the lid in an open state therein, the translucent part being positioned in the lid receiving recess when the lid is in the open state.

7. The vehicle port device according to claim 1, wherein the first display unit extends annularly around the port module.

8. The vehicle port device according to claim 7, wherein a part of the first display unit opposes the translucent part.

9. The vehicle port device according to claim 8, wherein the part of the first display unit opposing the translucent part is broader and/or brighter than a remaining part thereof.

* * * * *